Figure 1:
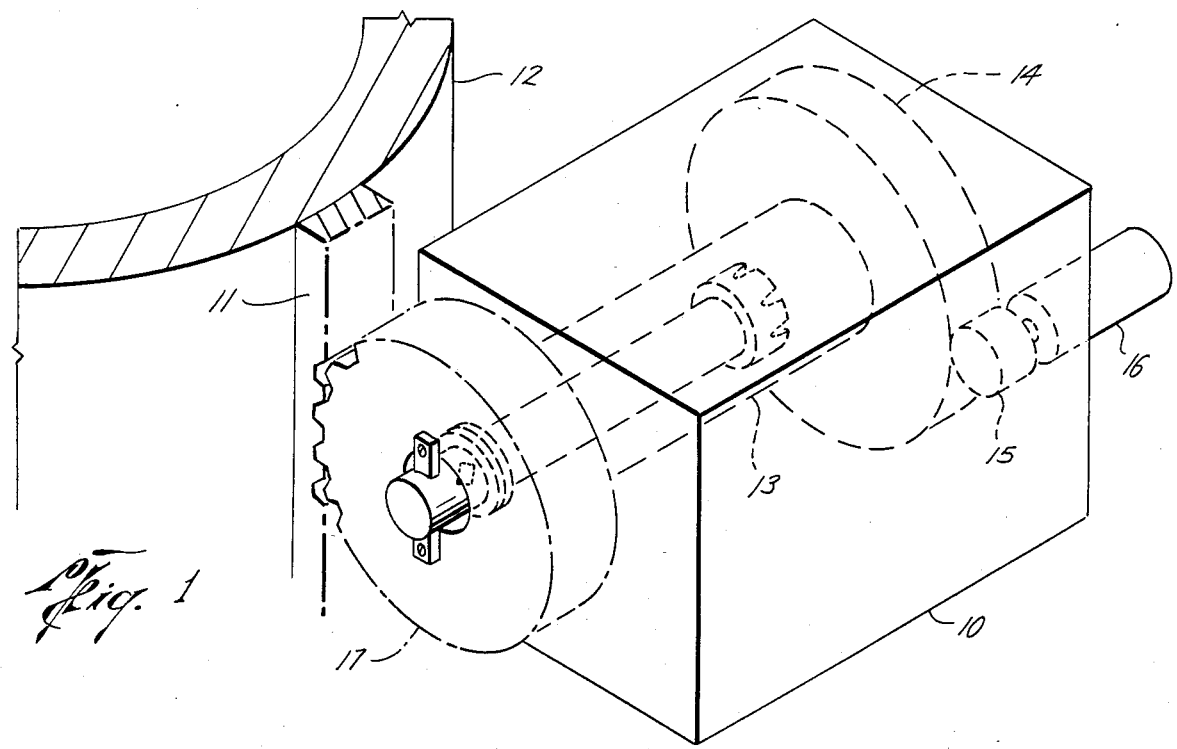

United States Patent [19]

Fry

[11] Patent Number: 4,587,854
[45] Date of Patent: May 13, 1986

[54] LIFTING APPARATUS

[76] Inventor: Robert A. Fry, 910 Forsythe La., Houston, Tex. 77073

[21] Appl. No.: 628,032

[22] Filed: Jul. 5, 1984

[51] Int. Cl.$^4$ .............................................. G01L 3/10
[52] U.S. Cl. ................................ 73/862.31; 73/862.3; 73/862.35
[58] Field of Search ........... 73/862.31, 862.35, 862.32, 73/862.33, 862.34; 177/211, 146, DIG. 5

[56] References Cited

U.S. PATENT DOCUMENTS

| 1,088,463 | 2/1914 | Shepherd | 177/146 |
| 3,103,984 | 9/1963 | Ellis et al. | 177/211 |
| 3,707,076 | 12/1972 | Jones | 177/211 |
| 3,877,274 | 4/1975 | Wahlstedt | 73/862.32 |

Primary Examiner—Donald O. Woodiel
Attorney, Agent, or Firm—Vaden, Eickenroht, Thompson & Jamison

[57] ABSTRACT

A shaft supported on a first member for rotation about a generally horizontal axis and having a pinion gear on its free end engageable with a rack extending vertically along a second member, whereby one member may be raised or lowered with respect to the other upon rotation of the shaft, and the torque in the shaft between its ends may be measured to determine the load on the gear teeth.

5 Claims, 3 Drawing Figures

LIFTING APPARATUS

This invention relates generally to apparatus for lifting one member with respect to another supported member by means of a rack extending vertically along a first of the members and a power driven shaft rotatably mounted on a second of the members and having a pinion gear on its free end engageable with the rack. More particularly, it relates to improved apparatus for measuring the extent to which the end of the shaft engageable with the rack is twisted with respect to the driven end thereof, and thus the extent to which the gear teeth are loaded.

It may be necessary or at least desirable to make such measurements when, for example, such shafts are supported on a platform of an offshore drilling rig having legs extending upwardly from the ocean floor, and the pinions gears on the free ends of the shafts are engaged with racks extending vertically along the sides of the legs, whereby the platform may be raised or lowered in response to rotation of the shafts. If the gear teeth are unequally loaded, some may be loaded beyond the breaking point, in which case the rack and pinions, whether on the same or on different legs, or both, may require adjustment in order to more equally distribute the load on the gear teeth.

Due to the size of equipment of this latter type, it would be impractical to measure torque in the shaft by means of conventional mechanisms such as strain gauges. Thus, due to the small areas of the shafts to which they would be wired, as compared with the lengths of the shafts, such gauges would not provide accurate measurements. Also, in equipment of the type described, it may be difficult to wire a gauge to an area of the shaft in which it would be protected from damage, or in which it would be convenient to sense a signal from the gauge during rotation of the shaft.

It is therefore an object of this invention to provide apparatus of this type in which the torque in the shaft may be accurately measured without physical connections to the outside of the shaft intermediate its ends, which enables a signal indicative of the extent of the torque in the shaft to be sensed during shaft rotation, which is of relatively simple and inexpensive construction, which can be installed on existing shafts with minimum modification, and which has parts which are easily and readily replaceable or repairable.

This and other objects are accomplished, in accordance with the illustrated embodiments of the invention, by apparatus of the type described wherein the shaft has a bore which extends from one end, and a rod extends within the bore between one of its ends mounted on the shaft to prevent its rotation with respect to the shaft. More particularly, the apparatus includes means on the one end of the shaft and the adjacent end of the rod for measuring the extent of rotation between them and thus the extent of the load on the gear teeth, and thus at an area which is of such small extent relative to the length of the shaft that the measurement is highly accurate, and which is so located as to avoid the need for wiring or otherwise attaching parts of the measuring means to the outside of the shaft intermediate its ends.

In one embodiment of the invention, the adjacent ends of the shaft and rod are connected to one another by a short sleeve of rubber or other material more flexible than that of the shaft and rod, and a strain gauge is wired to the sleeve to measure the torque in the small area of the sleeve intermediate its ends. In another embodiment, rotary transducer parts are mounted on the free end of the rod and the opposite face of a plate mounted across the open end of the shaft. In either case, a ring of a commutator may be mounted on the platform adjacent the open end of the shaft, in order to cooperate with another part of the commutator which is mounted on the end of the shaft in position to sense a signal from the strain gauge or rotary transducer part of the measuring means.

As in other types of apparatus using large diameter shafts for similar purposes, rotary shafts for raising and lowering the platforms of offshore rigs of the type described are ordinarily hollow and thus uniquely prepared for installation of the rod. In any event, a solid shaft could be easily prepared for installation of the rod by merely boring it through one end thereof to the desired extent. As will be described, although it is desirable that the rod extend for a substantial length of the shaft, the one end of the rod need not necessarily be mounted at the driven end of the shaft since the total twist between the driven and driving ends of the shaft may be determined by calibration depending on the location of the fixed end of the rod.

In the preferred and illustrated embodiments of the invention, the rod has means for releasably mounting its one end within the bore of the shaft. Thus, upon removal of the commutator from across the open end of the shaft bore, the rod and the measuring means on its outer end may be removed for replacement or repair.

Figure 2:
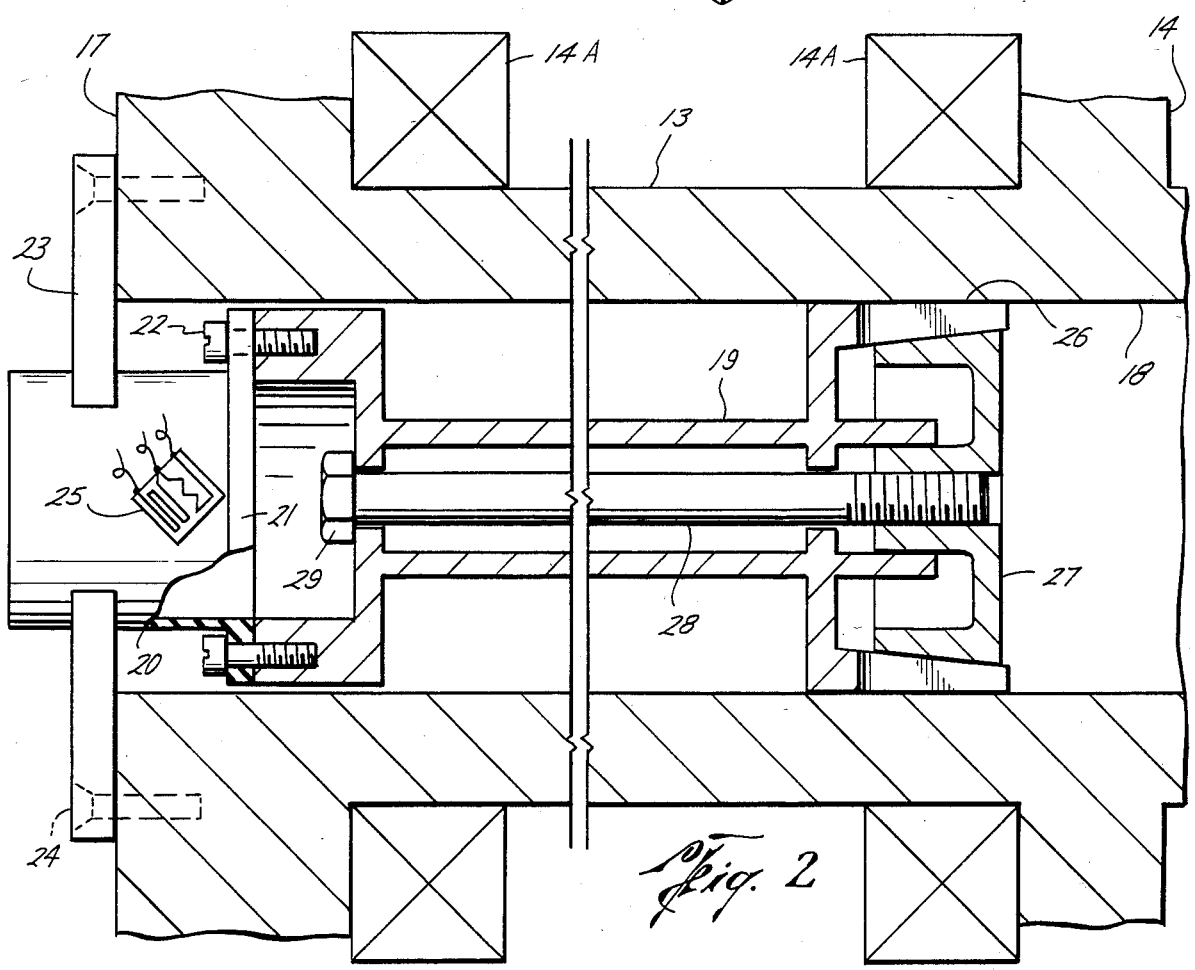
Figure 3:
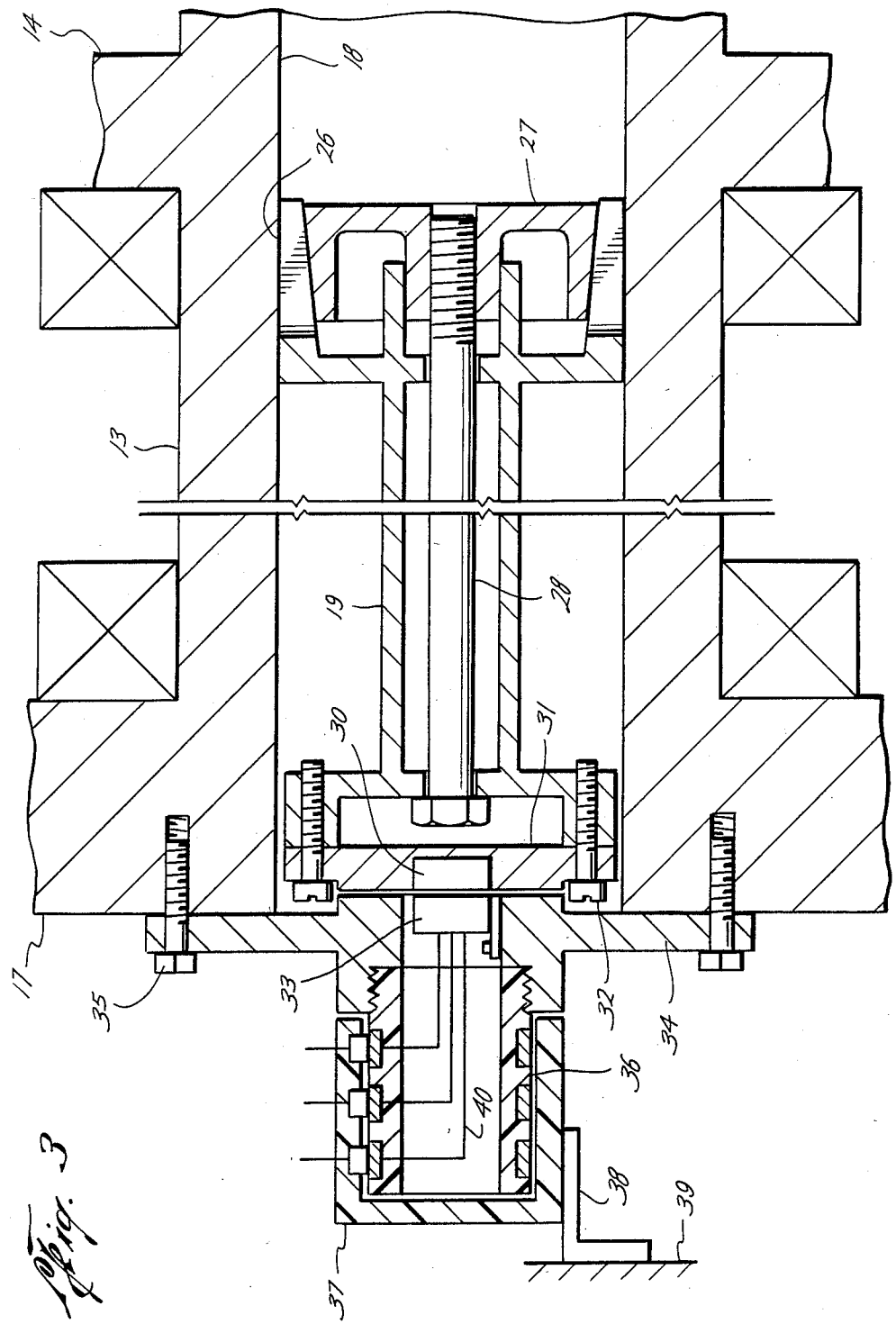

In the drawings:

FIG. 1 is a perspective view of apparatus constructed in accordance with the first-described embodiment of the invention, including a shaft rotatably mounted in a gear box adapted to be supported on the platform of an offshore rig, a pinion gear at one end of the shaft which extends out of the box to engage a rack extending vertically along a leg of the ring, a rod extending within the bore of the shaft, and means on the adjacent ends of the rod and shaft for measuring rotation between them;

FIG. 2 is an enlarged cross sectional view of the shaft, rod and measuring means shown in FIG. 1: and FIG. 3 is an enlarged longitudinal sectional view of the shaft, rod, and measuring means of apparatus constructed in accordance with the second described embodiment of the invention.

With reference now to the details of the above described drawings, the gear box 10 shown in FIG. 1 is adapted to be supported on the platform of an offshore drilling rig, and the rack 11 is mounted on a leg 12 of the rig from which the platform is supported. More particularly, the apparatus includes a shaft 13 which is rotatably mounted by means of bearings 14A within the gear box, and a large ring gear 14 on one end of the shaft which is driven by a pinion gear 15 on the driven shaft of a reversible motor 16, and another pinion gear 17 at the free end of the shaft having its teeth engagable with those of the rack 11. Thus, as previously described, this and other similarly mounted shafts may be rotated by means of the motor 16 in order to raise or lower the platform with respect to the legs of the rig.

As will be appreciated, the platform may include several decks or levels on which two or more shafts are mounted with pinions on their free ends engaged with the rack 11. Also, of course, racks on the other legs 12 of the rig are engaged by similar shaft mounted pinions 17, so that all shafts may be similtaneously rotated in order to raise or lower the platform.

As best shown in FIG. 2, shaft 13 has a bore 18 extending centrally from the open end thereof on which pinion gear 17 is mounted, and a rod 19 extends within the bore of the shaft between its inner, right hand end mounted against rotation with respect thereto, and its other, left hand end which is adjacent the open end of the bore. In this first embodiment of the invention, the free end of rod 19 is connected to the pinion gear 17 and thus the adjacent end of shaft 13 by means of a short sleeve 20 of rubber or other material more flexible than the shaft. As shown in FIG. 2, the sleeve has a flanged end 21 which is secured to the end of rod 19 by bolts 22 or the like, and a holder near its other end having arms 23 secured by screws 24 or the like to the outer face of the pinion 17, whereby such other end of the sleeve is rotated relative to the end of the rod to an extent dependent on the torque or twist in the shaft intermediate its ends. More particularly, a strain gauge 25 of conventional construction is wired to the sleeve 20 intermediate the holder arms 23 and the flange 21, and thus in position to measure the amount of strain or torque in the short length of the sleeve between the connection of its opposite ends to the rod and the shaft.

The signals from the strain gauge 25 representative of the extent of strain or torque in the sleeve, and thus representative of the rotation in the shaft 13 intermediate gears 14 and 17, are sensed by means of a commutator, as will be more particularly described in connection with FIG. 3. As shown, and as previously mentioned, the rod 19 does not extend the full length of the shaft 13 intermediate the pinion gears 14 and 17. Nevertheless, it does extend for a substantial length thereof, and in any event, the signal from the strain gauge may be calibrated in a manner well known in the art in accordance with the relative lengths of the rod and the shaft intermediate the pinion gears.

As shown, and as previously described, the right hand, inner end of the rod 19 is releasably mounted within the bore 18, whereby upon removal of the commutator from across the open end of the shaft, and release of arms 23, the strain gauge 25 may be removed for repair or replacement. In the illustrated embodiment of the invention, this mounting means comprises split fingers 26 on the end of the shaft which fit closely within bore 18 and which have tapered inner surfaces which are engaged by an expander ring 27 having similarly shaped outer surfaces. The expanding ring is threadedly connected by a bolt 28 to the free end of the shaft, so that, as will be apparent from FIG. 2, it may be either tightened or loosened by manipulation of the head 29 on the left hand end of the bolt. As will also be apparent from FIG. 2, access may be had to the bolt by release of the holder arms 23 and removal of the bolts 22 and thus the sleeve 20 from the left hand end of the rod.

The embodiment of the invention shown in FIG. 3 differs from that above described only in the means by which rotation between the free end of the rod and the adjacent end of the shaft is measured. Thus, in this second embodiment, relative rotation between these parts is measured by means of a rotary transducer including a first part 30 carried by a plate 31 connected to the left hand, free end of the rod by means of bolts 32, and a second part 33 mounted on a holder having arms 34 releasably connected to the outer face of pinion gear 17 by means of bolts 35.

As shown, a first commutator part 36 is connected to and extends outwardly from the plate 34, and a second communator part 37 is mounted on a bracket 38 on the platform 39 or other support member, whereby it is fixed against rotation. As shown in FIG. 3, wires 40 connect transducer part 33 to the contacts of the rotating commutator part 36, which slide within contacts of the non-rotating part 38 in order to permit signals to be transmitted from the transducer to a suitable device from which the measurements may be read during rotation of the shaft. Obviously, signals from strain gauge 25 may be transmitted in a similar fashion.

As shown in FIG. 3, the inner end of rod 19 is releasably mounted within the bore of the shaft in the same manner shown in FIG. 2. Upon removal of plate 34, and the commutator and transducer part carried thereby, plate 31 and the transducer part carried thereby may be removed from across the end of the rod to permit access to the bolt for in turn releasing the rod for removal from within the shaft bore.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In apparatus having one member which is to be lifted with respect to another supported member, a rack extending vertically along a first of the members, a shaft rotatably mounted on the second member, said shaft having a pinion gear on one end engageable with the rack and a bore extending inwardly from its one end, drive means engageable with the other end of the shaft for rotating it, a rod extending within the bore having one end mounted on the shaft within the bore to prevent its rotation with respect to the shaft, and means on the one end of the shaft and other end of the rod for measuring the extent of rotation of said one end of the shaft with respect to the other end of the rod.

2. In apparatus of the character defined in claim 1, wherein the measuring means includes a part connected to each of the one end of the shaft and other end of the rod, and means for measuring the strain in said part.

3. Apparatus of the character defined in claim 1, wherein the measuring means includes a first transducer part on the other end of the rod, and a second transducer part mounted on the one end of the shaft and facing the first transducer part for measuring the extent of rotation of the second part with respect to the first part.

4. Apparatus of the character defined in claim 1, wherein said rod has means for releasably mounting its one end within the bore of the shaft.

5. Apparatus of the character defined in claim 1, wherein said measuring means includes a commutator having a first part mounted on the one end of the shaft and connecting with the measuring means to sense a signal therefrom representative of the extent of rotation of the one end of the shaft relative to the rod fixed to the one end of the shaft, and a second part fixed with respect to the first member and arranged to transmit the signal from the first part to a read out device.

* * * * *